United States Patent [19]

Löfgren et al.

[11] Patent Number: 5,133,999
[45] Date of Patent: Jul. 28, 1992

[54] PACKAGING MATERIAL OF LAMINATE TYPE

[75] Inventors: Lars Löfgren, Staffanstorp; Cecilia Svensson, Södra Sandby, both of Sweden

[73] Assignee: Tetra Pak Holdings, S.A., Pully, Switzerland

[21] Appl. No.: 598,114

[22] Filed: Oct. 16, 1990

[30] Foreign Application Priority Data

Oct. 16, 1989 [SE] Sweden ................................. 8903394

[51] Int. Cl.$^5$ ............................................ B29D 22/00
[52] U.S. Cl. .................................. 428/34.2; 426/106; 428/36.7; 428/349; 428/335; 428/511; 428/520; 428/537.5
[58] Field of Search ............... 428/36.7, 34.2, 349, 428/511, 537.5, 520, 335; 426/106

[56] References Cited

U.S. PATENT DOCUMENTS

| | | | |
|---|---|---|---|
| 3,882,259 | 5/1975 | Nohara et al. | 264/171 |
| 4,082,854 | 4/1978 | Yamada et al. | 426/106 |
| 4,701,360 | 10/1987 | Gibbons et al. | 428/349 |
| 4,789,575 | 12/1988 | Gibbons et al. | 428/34.2 |
| 4,894,267 | 1/1990 | Bettle, III et al. | 428/36.7 |
| 4,971,864 | 11/1990 | McCord | 428/36.7 |
| 4,988,546 | 1/1991 | Tanner et al. | 428/336 |

*Primary Examiner*—Edith L. Buffalow
*Attorney, Agent, or Firm*—Burns, Doane, Swecker & Mathis

[57] ABSTRACT

A flexible, laminated material (10) for reforming into packages for contents of the type such as oxygen- and flavor-sensitive liquid foods, for example fruit juices.

The material displays a carrier layer (11) of paper or paperboard and a preferably extruded layer (13) applied to one face of the carrier layer (corresponding to the inside of the finished package), this layer consisting of a mixture of polyethylene and ethylene vinyl alcohol copolymer.

Since the barrier layer (13) thus includes both a polar (the ethylene vinyl alcohol copolymer) and a non-polar (polyethylene) component, the material possesses barrier properties against both polar and non-polar flavor components, at the same time as the material moreover displays tightness properties vis-á-vis oxygen.

17 Claims, 1 Drawing Sheet

PACKAGING MATERIAL OF LAMINATE TYPE

TECHNICAL FIELD

The present invention relates to a flexible sheet- or web-form material of laminate type for reforming into package cartons with superior flavour barrier properties and other desirable tightness properties, the material including a layer which serves as a flavour barrier and consists of a plastic material including an ethylene vinyl alcohol copolymer.

BACKGROUND ART

Generally speaking, liquid foods such as fruit juices, cooking oil, wine etc., which are nowadays often packed and stored in packages of the single-use type (so-called disposable cartons), are products which are highly sensitive to the effects of oxygen and are flavour-sensitive products which are destroyed or tainted if they are exposed to the action of oxygen. Consequently, one minimum requirement placed on such disposable packages is that they must be as impermeable to oxygen as possible and, ideally, completely oxygen-tight in order to be able to provide the best possible protection against oxygen and thereby flavour protection to the packed products.

One packaging material which is often employed in disposable packages for such oxygen- and flavour-sensitive products consists of a plurality of layers laminated to one another and comprising a carrier layer of paper or paperboard and an aluminium foil bonded to one face of the carrier layer (corresponding to the inside of the finished package), the aluminium foil rendering the material practically impermeable to oxygen, and an outer protective polyethylene coating to avoid direct contact between the aluminium foil and the product which is to be packed.

Disposable packages which are produced from a packaging material including an aluminium foil possess extremely good tightness properties vis-á-vis oxygen, but, on the other hand, provide a more or less limited flavour protection to the packed product, in particular if this consists of citrus fruit juice or other fruit juices. One of the reasons for the defective flavour protection afforded by such a package could probably be traced to the protective polyethylene coating of the packaging material which, hence, is in immediate contact with the packed product and, because of its non-polar nature, at least to some degree absorbs, ingests and retains flavour or odour ingredients of a more or less non-polar nature of the type occurring in the above-mentioned types of juice products. For example, it has proved that the concentration of the non-polar flavour ingredient d-limonene gradually fades in the packed juice product and, in time, becomes so low that a manifest deterioration occurs in the flavour of the packed product. In addition, the material costs of the prior art packaging material are inescapably high because of the fact that it uses aluminium - a very expensive metal.

Consequently, the packaging technology art has long been in need of being able to develop an aluminium-free packaging material with superior tightness properties vis-á-vis oxygen and at the same time superior barrier properties against, or low absorption of, flavour and odour ingredients.

One such aluminium-free packaging material is disclosed in, for example, U.S. Pat. Ser. No. 4,701,360. This prior art packaging material is also of laminate type and includes a carrier layer of paper or paperboard and a layer of ethylene vinyl alcohol copolymer (EVOH) serving as oxygen and flavour barrier. A barrier layer of this type enjoys several merits. It possesses tightness properties vis-á-vis oxygen and has, moreover, (because of its polar nature) good barrier properties or low absorption tendencies in respect of non-polar flavour and odour ingredients, for example d-limonene, at the same time as being a material approved for direct contact with foods and, as a result, needing no additional protective coating. Furthermore, EVOH is a cheaper material than aluminium.

However, a packaging container with an inner barrier layer of EVOH in contact with the packed product has but slight barrier properties vis-á-vis polar flavour and odour ingredients, e.g. fruit alcohols which occur in citrus fruit juices and other fruit juices and which, thus, tend to migrate into and be ingested by the barrier layer at the same time as the packed juice loses its flavour to a corresponding degree. The problem inherent in the absorption of polar flavour and odour ingredients can, however, be solved by, for example, coating the barrier layer with an outer protective coating of non-polar material, for example polyethylene, as described in U.S. Pat. Ser. No. 4,789,575, but this prior art solution merely substitutes this problem with a new flavour problem in analogy with the above reasoning relating to the prior art packaging material with polyethylene coated aluminium foil.

OBJECTS OF THE INVENTION

One object of the present invention is, therefore, to propose a packaging material of the above-described laminate type for the production of packages possessing superior oxygen barrier properties and, at the same time, superior flavour barrier properties.

A further object of the present invention is to propose a packaging material with low absorption of both polar and non-polar flavour and odour ingredients of the type occurring in, for example, citrus fruit juices and other fruit juices.

Yet a further object of the present invention is to propose a laminated packaging material which may be readily reformed into packaging containers using modern, rational packaging machines of the type which are often employed today for producing single-use disposable packages or cartons for liquid foods and which both form, fill and seal finished packages at a high working rate.

SOLUTION

These and other objects will be attained according to the present invention in that a flexible, laminated packaging material of the type described by way of introduction is characterised in that the above-mentioned barrier layer consists of a mixture of polyethylene and ethylene vinyl alcohol copolymer.

According to the present invention, it has been that a barrier layer consisting of a mixture of the non-polar component polyethylene and the polar component ethylene vinyl alcohol co-polymer not only displays superior barrier properties vis-á-vis oxygen but also vis-á-vis flavour and odour ingredients of both polar and non-polar nature, and it has surprisingly been that this barrier layer possesses better flavour barrier properties taken as a whole than a corresponding barrier layer consisting only of ethylene vinyl alcohol copolymer or a barrier layer of pure ethylene vinyl alcohol copolymer coated with polyethylene.

One major advantage inherent in the material according to the present invention is that the surprisingly good combination of oxygen and flavour barrier properties is achieved even at such high polyethylene proportions as 80%, based on the total weight of the barrier layer. Such a substantial "dilution" of the relatively more expensive component of the barrier layer (the ethylene vinyl alcohol copolymer) by its correspondingly cheaper component (the polyethylene) entails that the total material costs for the material according to the present invention will be accordingly lower than for a comparable material including a barrier layer of pure ethylene vinyl alcohol copolymer. Moreover, the high admixture proportion of polyethylene entails that the heat-sealing properties of the barrier layer will be sufficiently good for the material according to the present invention readily to be reformed into packages with mechanically strong and durable seal joints using conventional heat-sealing technology during the production of the package.

As was mentioned above, the volume of polyethylene used in the barrier layer may amount to approximately 80 weight %, but should, on the other hand, not be less than 20 weight % in order that the barrier layer provide satisfactory protection also against non-polar flavour and odour ingredients. Ideally, the barrier layer includes polyethylene in a proportion of between 50 and 80 weight %, and in practice it has been that the amount of polyethylene should preferably lie in the order of approximately 60 weight %.

Should it prove necessary or appropriate for any reason to further improve the oxygen tightness of the material, the material may, according to another embodiment of the present invention, be provided with a supplementary oxygen barrier layer. Such may, for instance, be the case if the material is to be used for the production of packages in which particularly oxygen- and flavour-sensitive foods such as citrus fruit juices or other fruit juices are to be stored for lengthy periods and not necessarily in cold--storage. One such supplementary oxygen barrier layer preferably also consists of a mixture of polyethylene and ethylene vinyl alcohol copolymer, while barrier layers of other materials known in the art with low oxygen permeability may, of course, similarly be employed.

Preferred embodiments of the packaging material according to the present invention have further been given the characterising features as set forth in the appended subclaims.

BRIEF DESCRIPTION OF THE ACCOMPANYING DRAWING

The nature of the present invention and its aspects will be more readily understood from the following brief description of the accompanying Drawing, and discussion relating thereto.

In the accompanying Drawing:

FIG. 1 schematically illustrates the transverse structure of a packaging material according to a first embodiment of the present invention; and FIG. 2 shows a corresponding transverse structure of a packaging material according to a second embodiment of the present invention.

DESCRIPTION OF PREFERRED EMBODIMENTS

Figure 1:
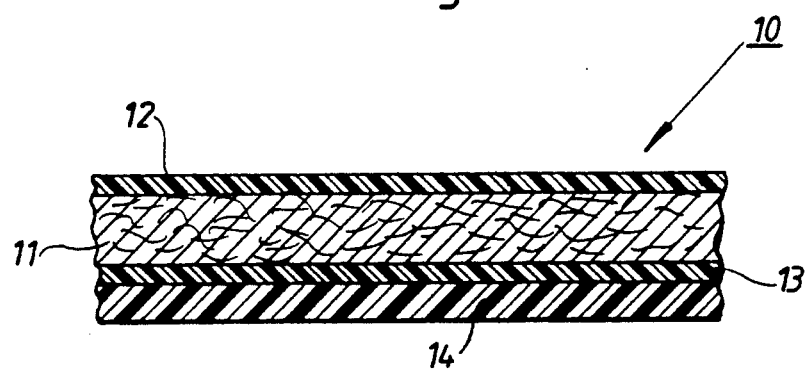

Referring to the Drawing, FIG. 1 thus schematically illustrates the transverse structural composition of a packaging material 10 according to a first embodiment of the present invention for producing packages of single-use disposable type for products such as fruit juices, cooking oil, wine and similar oxygen- and flavour-sensitive foods. The material 10 includes a stiff but foldable carrier layer 11 of paper or paperboard which, on its one face (corresponding to the outside of the finished package), is covered by a coating 12 of polyethylene or other moisture-proof, preferably heat-sealable thermoplastic material. The other face of the carrier layer is bonded, via a layer 13 of suitable binder, for example polyethylene, to a layer 14 serving as oxygen and flavour barrier and consisting of a mixture of polyethylene and ethylene vinyl alcohol copolymer.

The barrier layer 14 contains polyethylene in an amount of between 20 and 80, suitably between 50 and 80 and preferably approximately 60% of the total weight of the barrier layer, and is of a thickness which may vary between 5 and 50, preferably between 15 and 35 $\mu$m. The barrier layer 14 may be produced as a prefabricated extruded film which, with the aid of a suitable binder, is bonded to the carrier layer 11, but is preferably produced by extrusion direct against the above-mentioned face of the carrier layer.

A packaging material of the composition schematically illustrated in FIG. 1 is ideally employed for the production of packages for oxygen- and flavour-sensitive foods, for example fruit juices, which are to be stored preferably in cold-storage.

Figure 2:
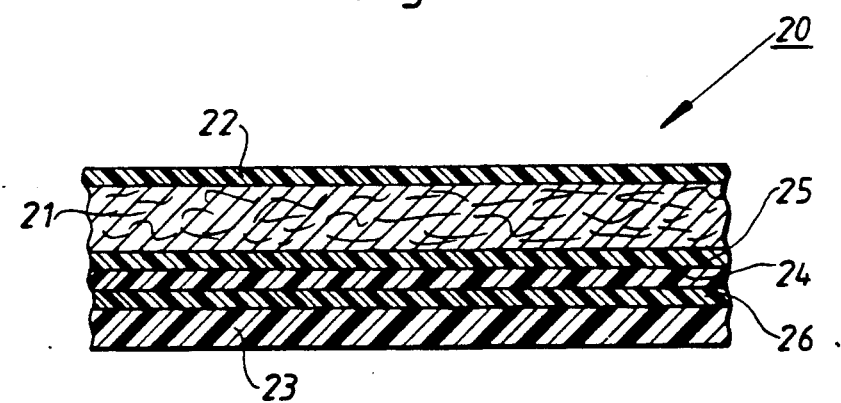

FIG. 2 schematically illustrates a cross-section through a packaging material 20 according to a second embodiment of the present invention for producing packages of single-use disposable type for the above-mentioned category of oxygen- and flavour-sensitive foods. Like the material 10 presented in FIG. 1, the material 20 also includes a carrier layer 21 of paper or paperboard which, on its one face (corresponding to the outside of the finished package), displays a coating 22 of polyethylene or other suitable moisture--proof, preferably heat-sealable thermoplastic material. The carrier layer 21 has, on its other face (corresponding to the inside of the finished package), an outer layer 23 acting as oxygen and flavour barrier and consisting of a mixture of polyethylene and an ethylene vinyl alcohol copolymer. The material 20 differs from the material 10 in that it is provided, between the carrier layer 21 and the barrier layer 23, with a supplementary layer 24 of a material with low permeability to oxygen. The supplementary oxygen barrier layer 24 is sandwiched between layers 25 and 26 of suitable binder which permanently bond the supplementary oxygen barrier layer 24 to the carrier layer 21, and the outer oxygen and flavour barrier layer 23 to the supplementary oxygen barrier layer 24, respectively.

The oxygen and flavour barrier layer 23 consists, like its counterpart barrier layer 14 in the material 10, of a mixture of polyethylene and ethylene vinyl alcohol copolymer, with the polyethylene in an amount of between 20 and 80, ideally between 50 and 80, and more specifically approximately 60% of the total weight of the mixture, and is of a thickness of between 5 and 50, preferably between 15 and 35 $\mu$m.

The supplementary oxygen barrier layer 24 also preferably consists of a mixture of polyethylene and an ethylene vinyl alcohol co-polymer and may, concerning composition and thickness, even be identical with the oxygen and flavour barrier layer 23 but may, of course, consist of other material known in the art with low permeability for oxygen, if deemed appropriate or desirable.

The material 20 which, as a result of the supplementary oxygen barrier layer 24, has reinforced impermeability to oxygen, is particularly suitable for the production of packages for flavour- and oxygen-sensitive products which are intended to be packed and stored for relatively longer storage times, but not necessarily in cold-storage.

As was mentioned above, the material according to the present invention may be employed for the production of single-use disposable packages using modern, rational packaging machines of the type which, from a web or from prefabricated sheets or blanks, both forms, fills and seals finished packages at a high working rate. From, for example, a web, packages are produced in that the two longitudinal edges of the web are united with one another to form a tube which is thereafter filled with the intended contents. The tube is then divided into individual package units by repeated flat pressing and transverse sealing of the tube along narrow zones transversely of the longitudinal direction of the tube. The individual package units are separated from one another by cuts in the transverse sealing zones and are given the desired final configuration, normally parallelipipedic, in an additional forming and sealing operation during which the double-walled triangular corners of the package units are folded towards and sealed against the outside of the package.

We claim:

1. A flexible laminated material for forming into package containers comprising:
    a carrier layer of paper or paperboard with an inner and outer surface corresponding to an inner and outer surface of a package container, and
    a flavour barrier layer on the inner surface of the carrier layer consisting of a mixture of ethylene vinyl alcohol copolymer and polyethylene.

2. The material as claimed in claim 1, wherein the flavour barrier layer includes polyethylene in an amount of up to 80% of the total weight of the flavour barrier layer.

3. The material as claimed in claim 1, wherein the flavour barrier layer includes polyethylene in an amount of between 50 and 80%.

4. The material as claimed in claim 1, wherein the flavour barrier layer is produced by extrusion.

5. The material as claimed in claim 1, wherein a supplementary oxygen barrier layer is disposed between the carrier layer and the flavour barrier layer.

6. The material as claimed in claim 5, wherein the supplementary oxygen barrier layer consists of a mixture of polyethylene and ethylene vinyl alcohol copolymer.

7. The material as claimed in claim 6, wherein the proportion of polyethylene in the supplementary oxygen barrier layer amounts to at most 80% of the total weight of the layer.

8. The material as claimed in claim 6, wherein the proportion of polyethylene in the supplementary oxygen barrier layer amounts to between 50 and 80% of the total weight of the layer.

9. The material as claimed in claim 5, wherein the supplementary oxygen barrier layer is produced by extrusion.

10. The material as claimed in claim 1, wherein the flavour barrier layer is of a thickness of between 5 and 50 $\mu$m.

11. The material as claimed in claim 1 wherein the flavour barrier layer includes polyethylene in an amount of approximately 60% of the total weight of the flavour barrier layer.

12. The material as claimed in claim 6 wherein the proportion of polyethylene in the supplementary oxygen barrier layer amounts to approximately 60% of the total weight of the layer.

13. The material as claimed in claim 1 wherein the flavour barrier layer is of a thickness of between 15 and 35 $\mu$m.

14. A flexible laminated material for forming into packages having improved flavour barrier and tightness properties comprising:
    (a) a carrier layer having an inner and outer surface;
    (b) an outer layer of a moisture-proof heat sealable material on said outer surface of said carrier layer;
    (c) a barrier layer on said inner surface of said carrier layer; and
    (d) a bonding layer between said carrier layer and said barrier layer;
    (e) said barrier layer being formed of a mixture of polyethylene and ethylene vinyl alcohol copolymer.

15. The material as claimed in claim 14 wherein said outer layer is formed of polyethylene.

16. The material as claimed in claim 14 including a second bonding layer between said first mentioned bonding layer and said carrier layer, and a second barrier layer between said first mentioned bonding layer and said second bonding layer.

17. The material as claimed in claim 16 wherein said second barrier layer is formed of a mixture of polyethylene and ethylene vinyl alcohol copolymer.

* * * * *